(12) United States Patent
Allen et al.

(10) Patent No.: US 7,625,618 B1
(45) Date of Patent: *Dec. 1, 2009

(54) ADVANCED COMPOSITE AEROSTRUCTURE ARTICLE HAVING A BRAIDED CO-CURED FLY AWAY HOLLOW MANDREL AND METHOD FOR FABRICATION

(75) Inventors: Gregory A. Allen, Prescott, AZ (US); Anthony E. Reed, Riverside, CA (US)

(73) Assignee: Rohr, Inc., Chula Vista, CA (US)

( * ) Notice: Subject to any disclaimer, the term of this patent is extended or adjusted under 35 U.S.C. 154(b) by 1167 days.

This patent is subject to a terminal disclaimer.

(21) Appl. No.: 10/440,061

(22) Filed: May 15, 2003

(51) Int. Cl.
*B29D 22/00* (2006.01)
*B29D 23/00* (2006.01)
*B32B 1/08* (2006.01)

(52) U.S. Cl. .................................. 428/36.91

(58) Field of Classification Search ............... 428/119, 428/76, 34.6, 34.7, 35.7, 36.9, 36.91, 174, 428/158, 118, 116; 52/789.1, 790.1, 793.1; 244/123

See application file for complete search history.

(56) References Cited

U.S. PATENT DOCUMENTS 5,332,178 A * 7/1994 Williams .................. 244/123
5,469,686 A * 11/1995 Pykiet ..................... 52/793.11
6,821,638 B2 * 11/2004 Obeshaw ................... 428/593

FOREIGN PATENT DOCUMENTS

EP          1122052 A2 *  8/2001

* cited by examiner

*Primary Examiner*—Michael C Miggins
(74) *Attorney, Agent, or Firm*—Goodwin Procter LLP

(57) ABSTRACT

An article of fiber-reinforced composite material formed by co-curing a lay up under a cycle of heat and pressure. The lay up comprises a first uncured composite layer having at least one uncured resin-impregnated laminate layer. At least one hollow mandrel is provided comprised of a stiffened braided fabric and having an upper, a lower and side surfaces. The mandrel is secured on the upper surface of the first composite layer with the lower surface thereof in engagement with the upper surface of the first composite layer. A second uncured composite layer is positioned over the upper and side surfaces of the hollow mandrel and at least a portion of the upper surface the first uncured composite layer. The second uncured composite layer has at least one uncured resin-impregnated layer. After the cycle of heat and pressure in an autoclave, the hollow mandrel is retained in the co-cured article.

16 Claims, 12 Drawing Sheets

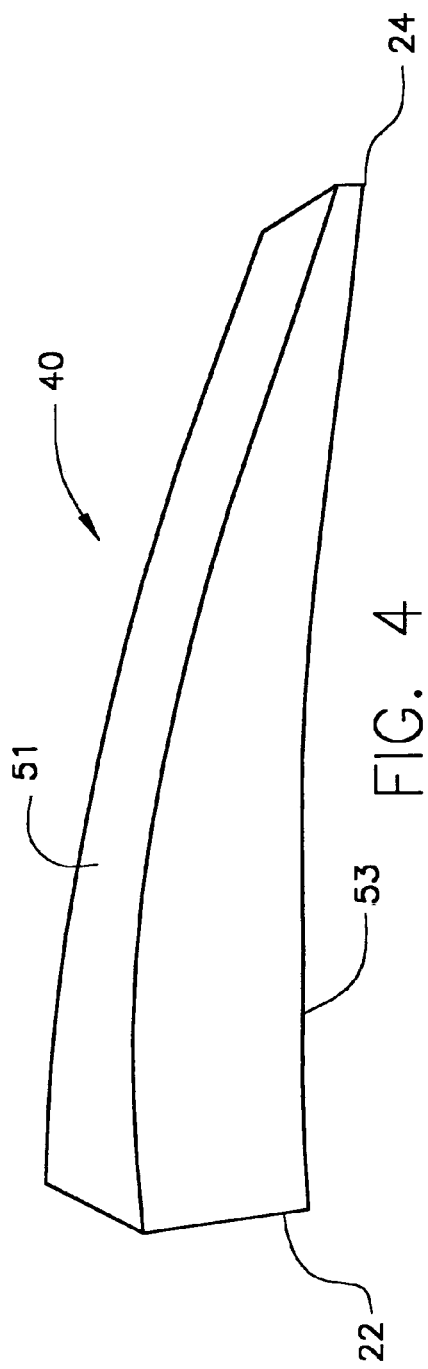
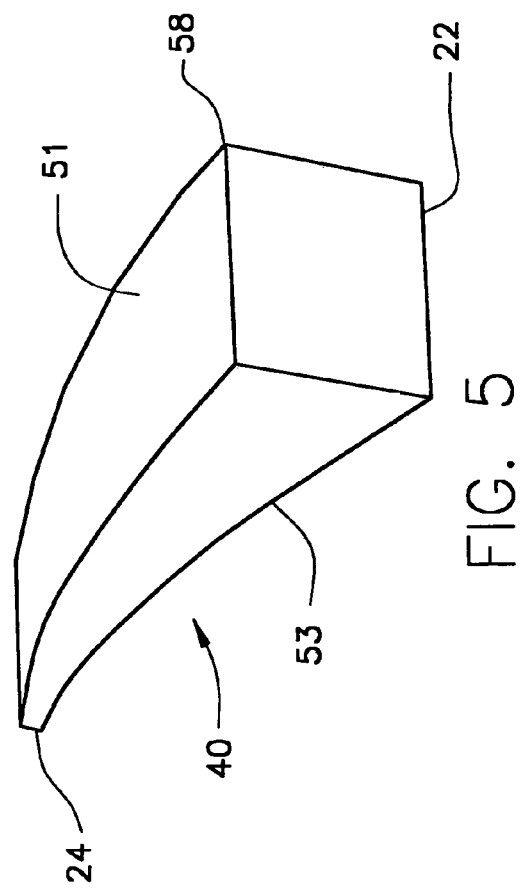

ADVANCED COMPOSITE AEROSTRUCTURE ARTICLE HAVING A BRAIDED CO-CURED FLY AWAY HOLLOW MANDREL AND METHOD FOR FABRICATION

BACKGROUND OF THE INVENTION

1. Field of the Invention

The present invention relates generally to the field of advanced composite aerostructure articles and methods of fabrication, more particularly, to an advanced composite aerostructure article having an integral co-cured fly away hollow mandrel and a method of fabrication.

2. Background Information

There is a growing trend in the aerospace industry to expand the use of advanced composite materials for a diverse array of structural and dynamic aerostructural applications because of the strength-to-weight advantage provided by composite materials. One particular application for the use of such advanced composite materials lies in the fabrication of advanced composite articles such as panels for nacelles for aircraft jet engine propulsion systems and for control surface components, such as spoilers. Such structural articles generally comprise inner and outer composite skins, which are formed from composite materials such as graphite or an aromatic polyamide fiber of high tensile strength that are embedded in a resinous matrix, e.g., epoxy, having a honeycomb core material interposed therebetween. One or more stiffening members may be affixed to the outer skin and covered with an inner skin for efficiently transmitting and/or reacting axial and/or bending loads to which the component is subjected. Aerostructure articles, such as spoiler components, have more than one external surface, i.e., a lower and upper surface, having curvatures and often taper, at an aft location, to a sharp edge. Manufacture of these articles present additional challenges to current techniques for fabricating composite structures.

There are two techniques currently employed for bonding through autoclave processing a composite stiffening member in combination with a composite structural panel: (1) the co-cured bonding method; and (2) the secondary bonding method. Both methods are disadvantageous in requiring costly non-recurring tooling and/or costly recurring manufacturing steps.

A typical composite sandwich panel intended for use as an aerostructure article is normally fabricated using two autoclave cured inner and outer composite skins that are formed by using a curing cycle with heat, pressure, and a unique tool for each skin. A sandwich panel is then made up using a composite bond jig, tool or fixture with the pre-cured face skin laid up on the bond jig tool followed by a ply of film adhesive, a honeycomb aluminum or non-metallic core of a given thickness, another ply of film adhesive and finally the previously pre-cured inner skin. The bond jig that is used to fabricate the sandwich panel is generally the same tool that was used to create the outer composite skin. A plurality of closure plies of uncured composite material are layed up and the assembled sandwich panel are cured during their final assembly stage. This sandwich panel is then vacuum bagged to the composite bond jig and again cured in an autoclave under high pressure and heat.

Thus, at least three very expensive and man-hour consuming cure cycles have gone into the fabrication of this exceptionally strong but lightweight composite/honeycomb core sandwich panel. At least two different and expensive tools are needed in this process. Manufacturing flow time is very long, energy use is high and the manufacturing floor space required is excessive.

The co-curing method envisions curing the composite inner and outer skins that are laid up with a layer of adhesive film and honeycomb core in one cure cycle in the autoclave. A co-cured panel is desirable in that it is less expensive to fabricate since only one bond jig tool is required, only one cure cycle is needed, it is less labor intensive, it requires less floor space to accomplish, and a much shorter manufacturing flow time is achieved. However, co-curing an aerostructure panel has never achieved widespread acceptance because of the large loss of panel strength and integrity that is lost due to the lack of compaction of the composite plies placed over and under the honeycomb core details. The composite plies dimple into the center of each core cell with nothing but the cell walls to compact the composite skins. The only way to overcome this knockdown factor is to add extra plies which creates both unwanted weight and excess cost. Thus, because of these constraints co-cured aerostructure panels are not widely manufactured in the aerospace industry.

There are other particular problems when a honeycomb core element is used to provide a stiffening element for an aerospace article such as a fan cowl. As Hartz et al described in U.S. Pat. No. 5,604,010 concerning a "Composite Honeycomb Sandwich Structure," with a high-flow resin system, large amounts of resin can flow into the core during the autoclave processing cycle. Such flow robs resin from the laminate, introduces a weight penalty in the panel to achieve the desired performance, and forces over-design of the laminate plies to account for the flow losses. To achieve the designed performance and the corresponding laminate thickness, additional plies are necessary with resulting cost and weight penalties. Because the weight penalty is severe in terms of the impact on vehicle performance and costly in modern aircraft and because the flow is a relatively unpredictable and uncontrolled process, aerospace design and manufacture dictates that flow into the core be eliminated or significantly reduced. In addition to the weight penalty from resin flow to the core, it was discovered that microcracking that originated in the migrated resin could propagate to the bond line and degrade mechanical performance. Such microcracking potential has a catastrophic threat to the integrity of the panel and dictates that flow be eliminated or, at least, controlled.

Unfortunately, the use of honeycomb core as a stiffener for elements in an aerostructure article such as a fan cowl, or in a structural panel has other deleterious effects, two of the greatest drawbacks to aluminum core being its inherent significant cost and corrosion. To minimize galvanic corrosion of the core caused by contact with the face skins, isolating sheets are interposed between such aluminum core and the face skins. Also, the aluminum core has an inherent cost and also must be machined to a desired shape in an expensive process. The honeycomb core may also be subject to crush during manufacture and thereby limits the pressures that may be used in autoclave processing. Also, the honeycomb core if damaged in use has a spring back effect which makes the detection of such damage more difficult.

Another method for reinforcing mandrels for stiffener elements, such as hat sections, for aerospace advanced composite structural panels involves the use of a composite stiffening member formed over a polyimide foam mandrel which is fabricated by machining a core mandrel to a desired shape. Obviously, the machining of the core mandrel is expensive and time consuming and further introduces the problem of properly bonding the core mandrel to inner and outer skins.

A novel and useful technique for fabricating an advanced composite aerostructure article is described in U.S. Pat. No. 6,458,309, and co-pending U.S. application Ser. No. 10/142, 490, filed May 5, 2002, both of which are incorporated by reference in their entirety herein.

A need has arisen for a practical method of readily producing stiffened, fiber-reinforced composite structures for aerospace applications which are cost and labor efficient and which save time in the fabrication process.

SUMMARY OF THE INVENTION

Accordingly, it is an object of the present invention to provide a method for fabricating aerostructure advanced composite articles that eliminates honeycomb core in stiffening elements, provides a lighter weight assembly and is easier to repair.

Another object of the present invention is to reduce the lay up cost of known advanced composite co-cure assemblies and to increase assembly strength over such existing co-cure assembly by being able to utilize advanced pressures in autoclave processing.

Yet another object of the present invention is to improve the quality of assembly of such co-cured advance composite assemblies and thereby increase customer satisfaction.

A further object of the present invention is to provide a process that provides an aerostructure component having a plurality of external curved surfaces and that tapers to a narrow dimension.

These and other objects of the invention, which will become apparent with reference to the disclosure herein, are accomplished by a new and improved method for fabricating an advanced composite aerostructure article from fiber reinforced composite material and incorporating a hollow stiffened graphite fabric mandrel that becomes an integral part of such article.

In accordance with a preferred embodiment of the present invention, an article of fiber-reinforced composite material formed by co-curing a lay up under a cycle of heat and pressure is provided, wherein the lay up comprises a first uncured composite layer having at least one uncured resin-impregnated laminate layer. At least one hollow mandrel is provided comprised of a pre-cured stiffened braided or woven fabric and having an upper, a lower and side surfaces and being secured on the upper surface of the first composite layer with the lower surface thereof in engagement with the upper surface of the first composite layer A second uncured composite layer is positioned over the upper and side surfaces of the hollow mandrel and at least a portion of the upper surface of the first uncured composite layer. The second uncured composite layer has at least one uncured resin-impregnated layer. The hollow mandrel is retained in the co-cured article.

According to an exemplary embodiment, the hollow mandrel of the lay up is impregnated with a resin. The hollow mandrel of the lay up may be pre-cured to a predetermined shape. At least one of the upper and lower surface of the hollow mandrel may have a curved shape. The hollow mandrel of the lay up may have a cross-sectional area that varies along a longitudinal extent thereof.

The lay up may include multiple hollow mandrels secured to the first composite layer in a laterally spaced-apart relation, and the second composite layer covers the two laterally spaced-apart hollow mandrels. At least one of the first and second uncured composite layer may comprise a plurality of serially laid-up uncured resin impregnated layers.

A third uncured composite layer may be provided having at least one uncured resin-impregnated laminate layer. A second hollow mandrel, comprised of a pre-cured stiffened braided or woven fabric and having an upper, a lower and side surfaces, is secured on the upper surface of the third composite layer with the lower surface thereof in engagement with the upper surface of the third uncured composite layer. A fourth uncured composite layer positioned over the upper and side surfaces of the second hollow mandrel and at least a portion of the upper surface the third uncured composite layer, the fourth uncured composite layer having at least one uncured resin-impregnated layer, wherein the second hollow mandrel is retained in the co-cured article. The second composite layer is positioned in engagement with the fourth composite layer. The first and third composite layers may become the outer skin surfaces of the aerostructure article.

The cross-sectional area of the hollow mandrel may be varied as desired along the longitudinal extent thereof to provide a preferred shape such as a tapered section, and to provide multiple curved configurations.

In accordance with the invention, the objects of providing an improved aerostructure article have been met. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the attached claims.

BRIEF DESCRIPTION OF THE DRAWINGS

For a fuller understanding of the nature and objects of the invention, reference should be had to the following detailed description taken in conjunction with the accompanying drawings in which:

FIG. 4 is a side view of a mandrel comprising a braided fabric useful for fabricating the article of FIG. 1 in accordance with the present invention.

FIG. 5 is a perspective view of the mandrel of FIG. 4 in accordance with the present invention.

Similar numerals refer to similar parts in the drawing.

DETAILED DESCRIPTION OF THE INVENTION

Figure 1:
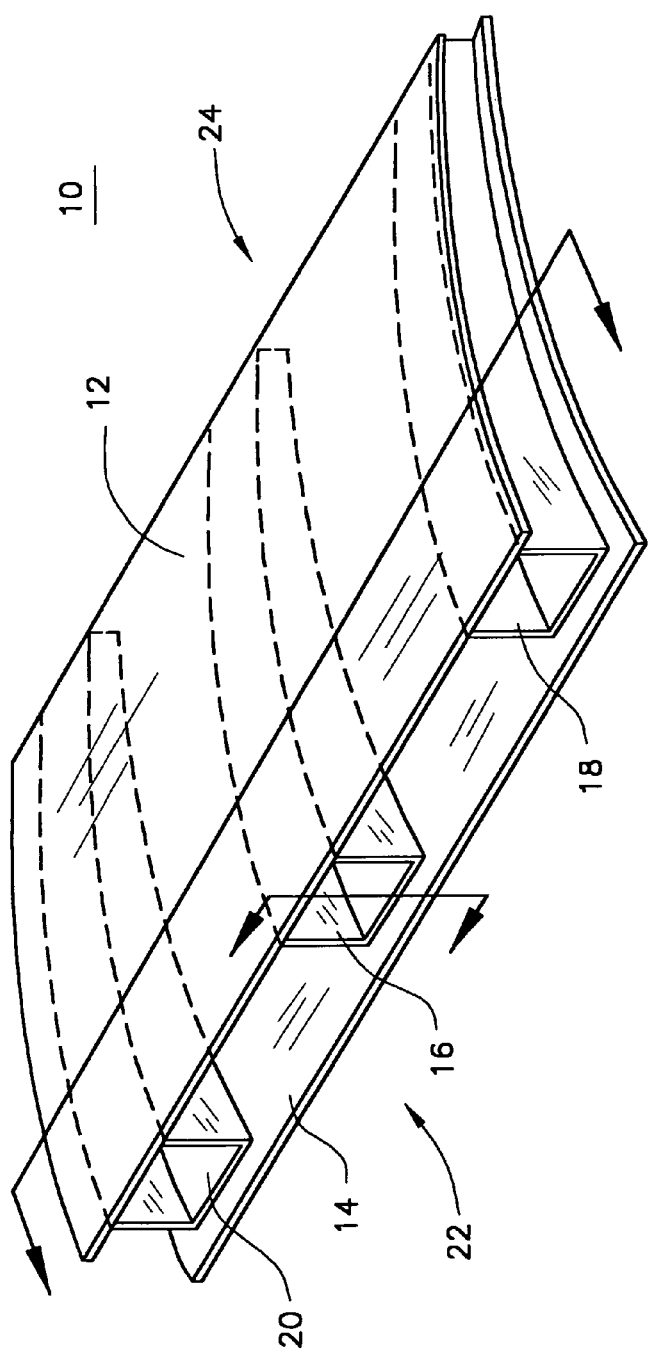
FIG. 1 is a perspective of a co-cured aerospace article that has been fabricated by the method of a preferred embodiment of the present invention.

Referring to the drawings in detail and in particular to FIG. 1, the reference character 10 generally designates an aerostructure article constructed in accordance with an exemplary embodiment of the invention. The article 10 is an advanced composite co-cured structure having a unitary skin 12 and 14 and longitudinally extending spaced reinforcing hat sections 16, 18 and 20 for the illustrated exemplary part. The article 10 as shown tapers from the forward portion 22 to the aft portion 24. The illustrative example of the invention 10, shown in FIG. 1, is representative of a spoiler unit for an aircraft wing, but the use of the invention for the fabrication of aerostructure articles extends to other shapes and applications.

Figure 2:
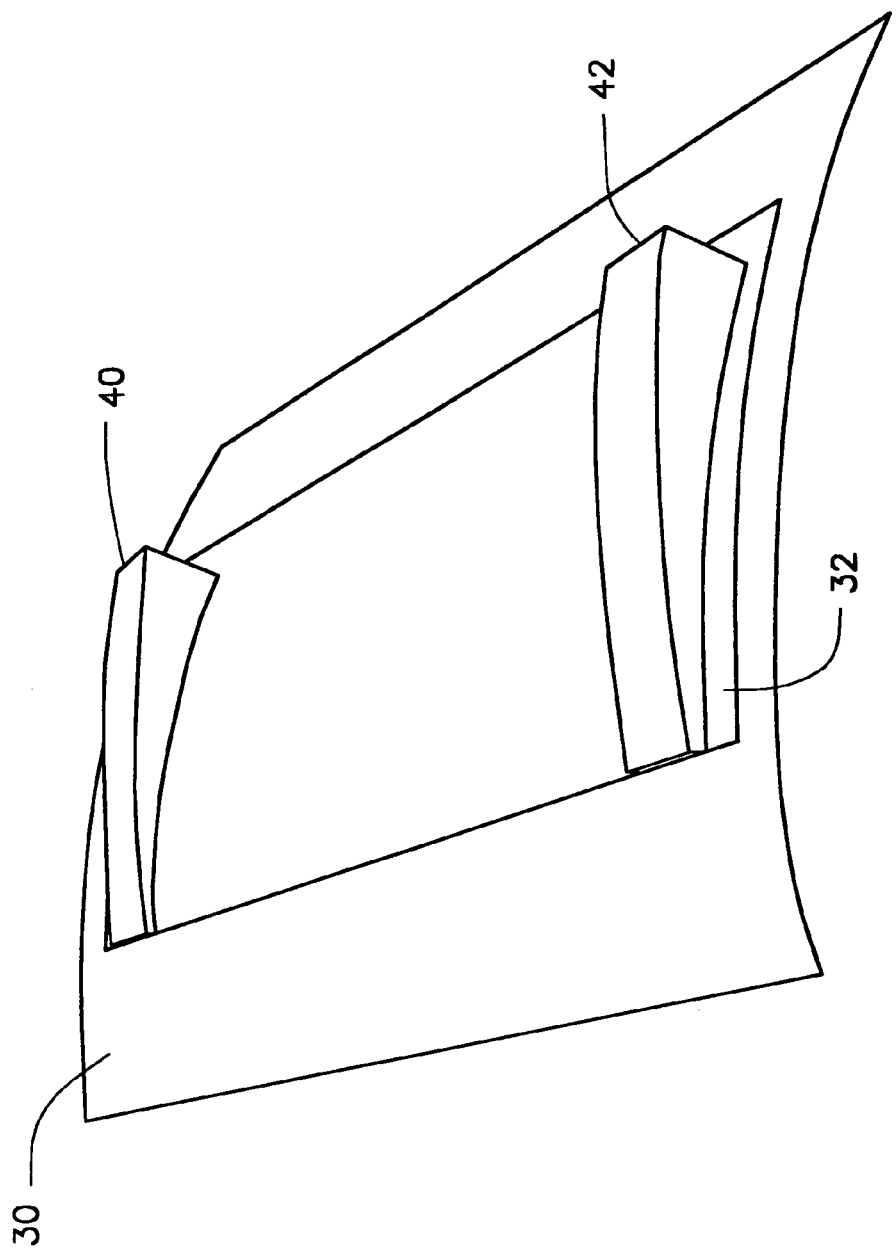
FIG. 2 is a perspective view of a stage in the process of fabricating the article of FIG. 1, in accordance with the present invention.

Referring now to FIG. 2, the specific novel method of the present invention will be described. A suitable lay-up mandrel or composite bond jig (COBJ) 30 having a predetermined shape, such as that used to provide the accurate shape of the skin 14 of the article 10 illustrated in FIG. 1, is provided for receiving a lay-up assembly for co-curing. A first uncured composite layer 32 is assembled on an upper surface of the COBJ 30 to provide the shape of at least one surface of the composite aerostructure article 10. The first uncured composite layer 32 having at least one uncured resin-impregnated laminate layer that is generally a graphite or aramid fabric laminate layer that is termed a "pre-preg" in the advanced composite manufacturing industry. In the exemplary embodiment, the first uncured composite layer 32 is comprised of six uncured resin-impregnated laminate plies of RMS-060 Type 2 material, which is a carbon fabric material in a 5-harness, balanced weave, 6000 end yarn (370 g/m$^2$) pre-impregnated with a 350° F. cure epoxy resin. RMS-060 Type 2 materials are available from, for example, Hexel Corporation and Cytec Corporation.

Figure 3:
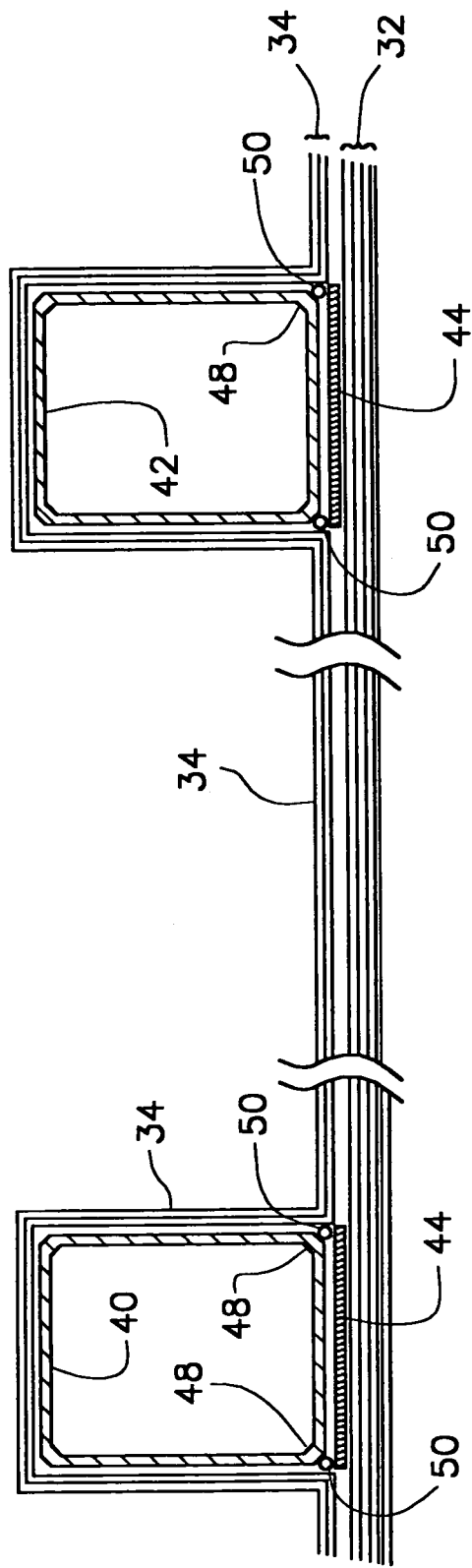
FIG. 3 is a transverse sectional view of a portion of the lay-up assembly in accordance with the present invention.

With reference to FIGS. 2 and 3, a pair of lightweight hollow mandrels 40 and 42 are used to form hat sections 18 and 20 of the article 10 (illustrated in FIG. 1, above.) Mandrels 40 and 42 are layed-up on the first uncured composite layer 32 by a suitable uncured tacking adhesive 44, shown in FIG. 3, such as BMS 5-154, which is a film adhesive consisting of a 350° F. cure epoxy resin coated to a final film weight of 0.03-0.08 PSF on a woven fiberglass fabric. Such BMS 5-154 materials are available, for example, from Cytec Corporation. The hollow mandrels 40 and 42 are, in effect, "tacked" to the first preform layer 32 by the adhesive.

Mandrels 40 and 42 are manufactured from a stiffened, braided material, such as carbon fiber with epoxy compatible surface finish. The mandrel may be woven with 3K, 6K, or 12K carbon fiber tow bundles in a variety of weave orientations or angles in order to achieve various complex geometries and load carrying capabilities. Custom tailored braided products are available from several sources including: A&P Technology; Atlantic Research Corporation; Fabric Development Inc.; Techniweave; and Textile Products Inc. Prior to tacking to the first uncured composite layer 32, the braided material of mandrels 40 and 42 is impregnated with a material, such as a resin material and then cured to a specific shape. Suitable resins include two part room temperature epoxy systems, 350° F. cure epoxy resin compatible with RMS 060 pre-impregnated carbon fabric materials, and higher cure temperature resin systems if required which are then cured to a specific shape. The shape of mandrels 40 and 42 depends upon the component being manufactured. As illustrated in FIGS. 4 and 5, the hollow mandrel 40 is a pre-stiffened shape that longitudinally extends along the upper surface of the layer 32. (Mandrel 42 is substantially identical to mandrel 40 illustrated in FIGS. 4 and 5.) The cross-sectional shape of the hollow mandrel 40 may be determined to provide optimal stiffening of the article 10. A cross-sectional form for the hollow mandrel 40 in the exemplary embodiment is rectangular (as illustrated in FIG. 5, above), but other shapes such as square, trapezoidal or round could be provided as desired. Another desirable feature of the hollow mandrel 40 is that the cross-sectional shape may be varied along the longitudinal extent of a hat section and to provide a curved upper surface 51 and/or lower surface 53. For example, if the article 10 were to be a spoiler unit then the height of the hollow mandrel 40 is decreased fore to aft to provide a tapered aft-portion of an airfoil shape. The hollow mandrels 40 are pre-stiffened to the extent required to provide a desired hat configuration during the continuing fabrication of the article 10 as described hereinafter.

Figure 6:
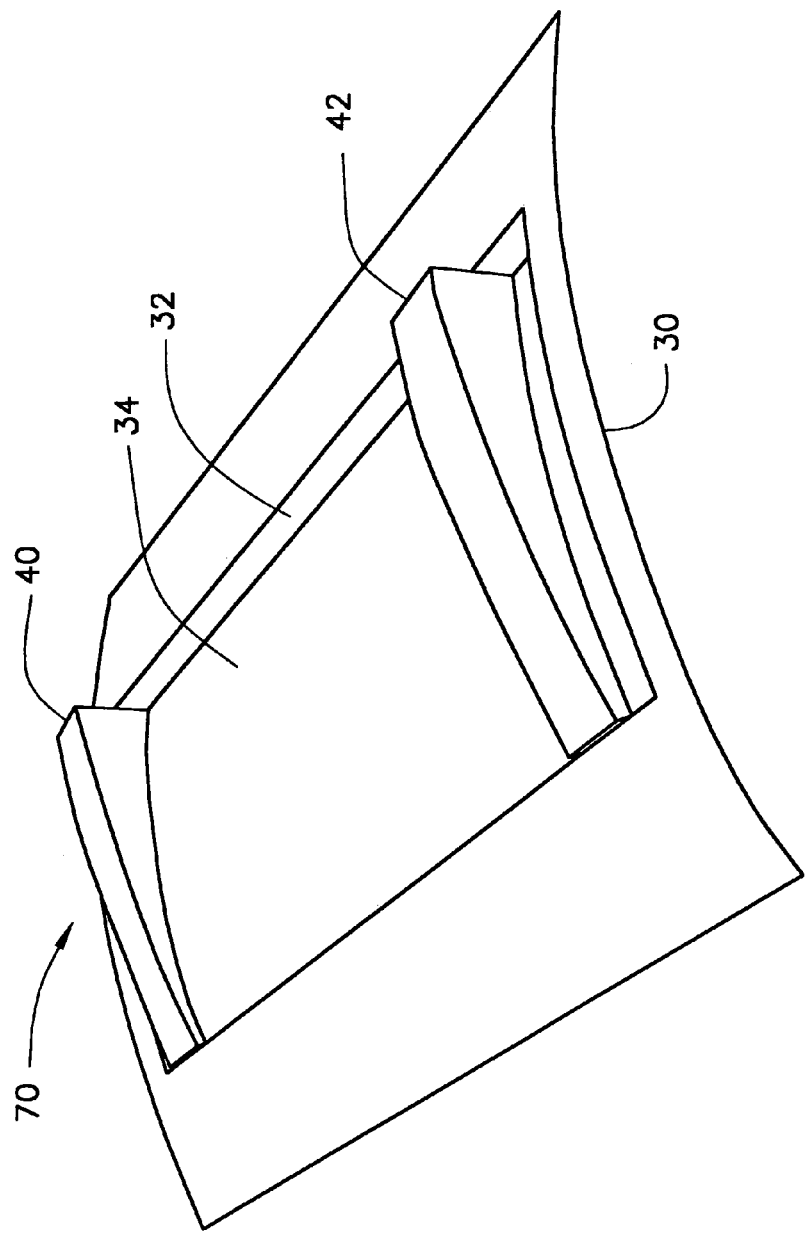
FIG. 6 is a perspective view of a further stage in the process of fabricating the article of FIG. 1, in accordance with the present invention.

As illustrated in FIGS. 3 and 6, a second uncured composite layer 34 is then assembled on the COBJ 30 over the upper outer surface of the hollow mandrels 40 and 42 and over at least a portion of the first composite layer 32. In the exemplary embodiment, second uncured composite layer 34 is a three-ply layer of material such as RMS 060 Type 3. RMS 060, Type 3 material is a carbon fabric in a 5 harness, balanced weave, 3000 end yarn (280 g/m$^2$) configuration which is pre-impregnated with a 350° F. cure epoxy resin. RMS 060 Type 3 material is used over the mandrel because of its improved conformability for lay up over the pre-cured mandrel and back down to the basic uncured skin. It is available from Hexcel Corporation and Cytec Corporation.

Depending upon the composition and manufacturing process, the cross-sectional shape of the hollow mandrels 40 and 42 may not have sharp corners, but rather more rounded corners 48 as illustrated in FIG. 3. While the strength of a hat section fabricated with hollow mandrels having rounded corners is sufficiently strong, the strength of such a hat section can be improved by optionally providing, in effect, a fillet 50 along the longitudinal length of the intersection of the bottom of the hollow mandrel 40 and 42 and the first composite preform layer 32, as illustrated in FIG. 3. This fillet 50 may be advantageously provided by positioning a very small roll of graphite fiber fabric material or a small roll of unidirectional material or longitudinally extending strands of such material in the small circumferentially extending gap provided by rounded corners 48 of hollow mandrels 40 and 42 and the first uncured composite layer 32 as shown in FIG. 3. The graphite fiber material of the fillet 50 may either be uncured resin-impregnated graphite material or a resin-free graphite material. In the exemplary embodiment, the fillet 50 is fabricated from RMS-040 material. RMS 040 material is unidirectional aligned carbon fiber tape (148/m$^2$) which is pre-impregnated with a 350° F. cure epoxy resin. It is available from Hexcel Corporation and Cytec Corporation. For clarity, the assembly of first uncured composite layer 32, mandrels 40 and 42, second uncured composite layer 34, and fillets 50, may be collectively referred to as first component 70 in FIG. 6.

Figure 7:
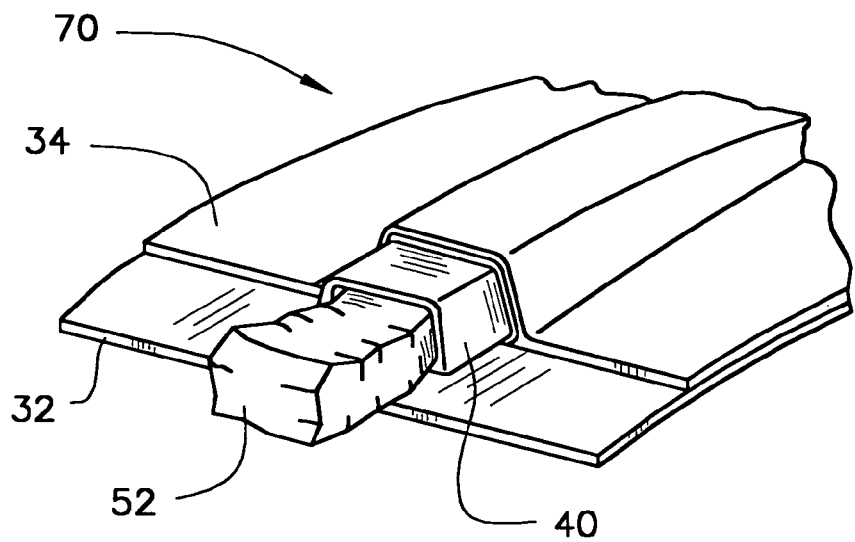
FIG. 7 is a perspective that illustrates the insertion of a tube bag into a hollow mandrel in accordance with the present invention.
Figure 8:
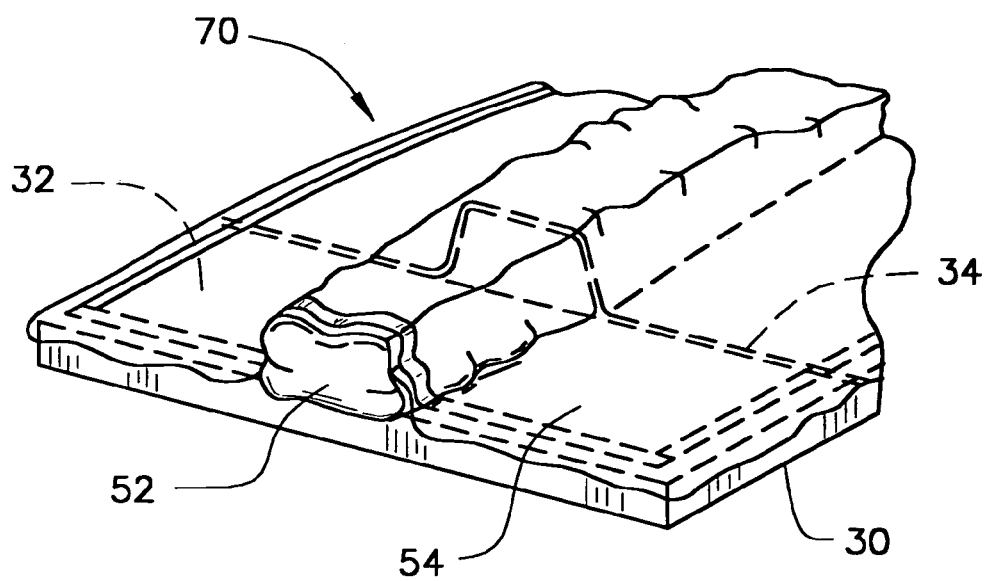
FIG. 8 is a perspective that illustrates the sealing of a tube bag to a vacuum bag and the sealing of the vacuum bag to a bond jig in accordance with the present invention.

The lay-up assembly (i.e., component 70) provided thus far by the method of this invention, is then covered by suitable vacuum bags 52 and 54 as shown in FIGS. 7 and 8. Tube bag 52 is positioned within mandrels 40 (FIG. 7) and 42 (not shown). Vacuum bag 54 is sealed to the tool periphery and to vacuum bag 52 using a suitable sealant tape such that the inside of tube bag 52 and the outside of bag 54 are exposed to the surrounding atmospheric pressure when vacuum is applied between tube bag 52 and vacuum bag 54 (FIG. 8). When vacuum is applied between bags 52 and 54 the surrounding atmospheric pressure pushes the bag against all flat areas of lay up 70, outside mandrels 40 and 42, and inside mandrels 40 and 42 such that the lay up is consolidated without collapsing the stiffener shape provided by the mandrels. The consolidation under vacuum is conducted for a specific period of time determined to achieve the desired level of compaction. A typical compaction time is 15 minutes or longer.

Figure 9:
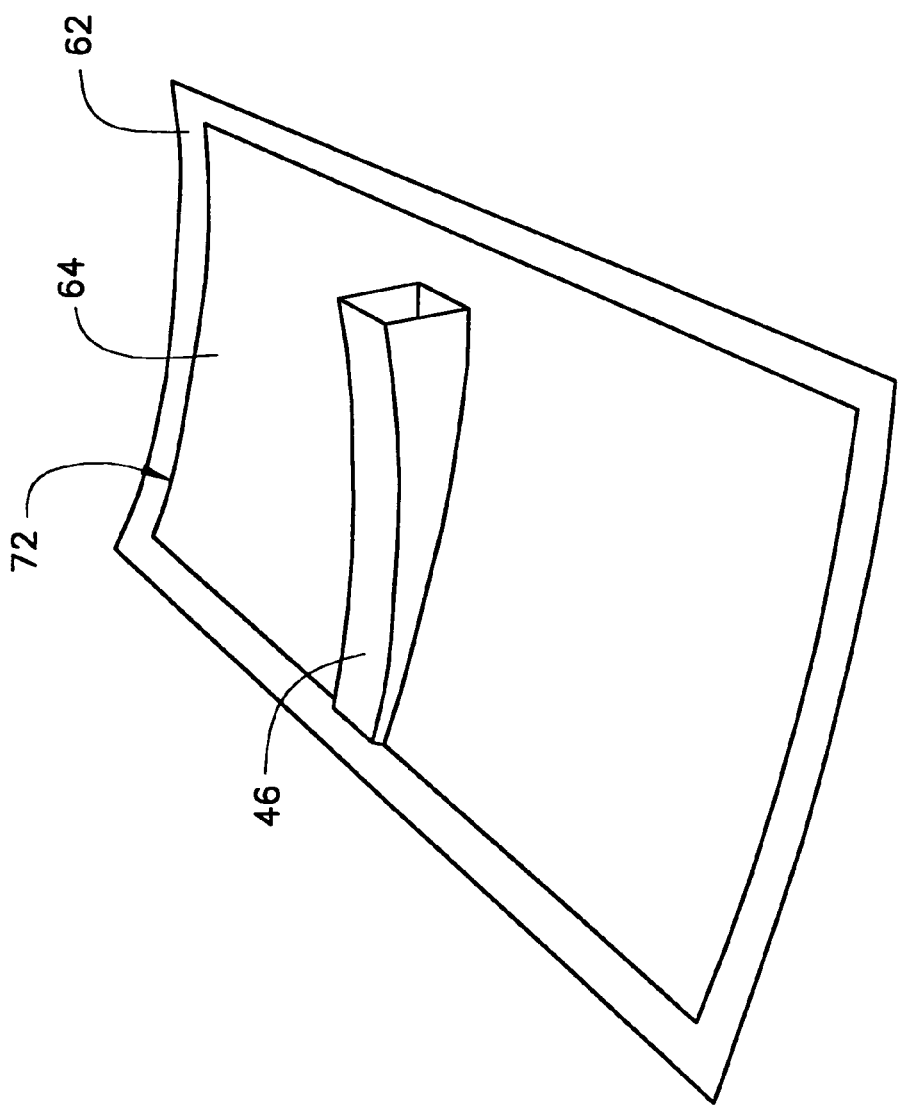
FIG. 9 is a perspective view of another stage in the process of fabricating the article of FIG. 1, in accordance with the present invention.
Figure 10:
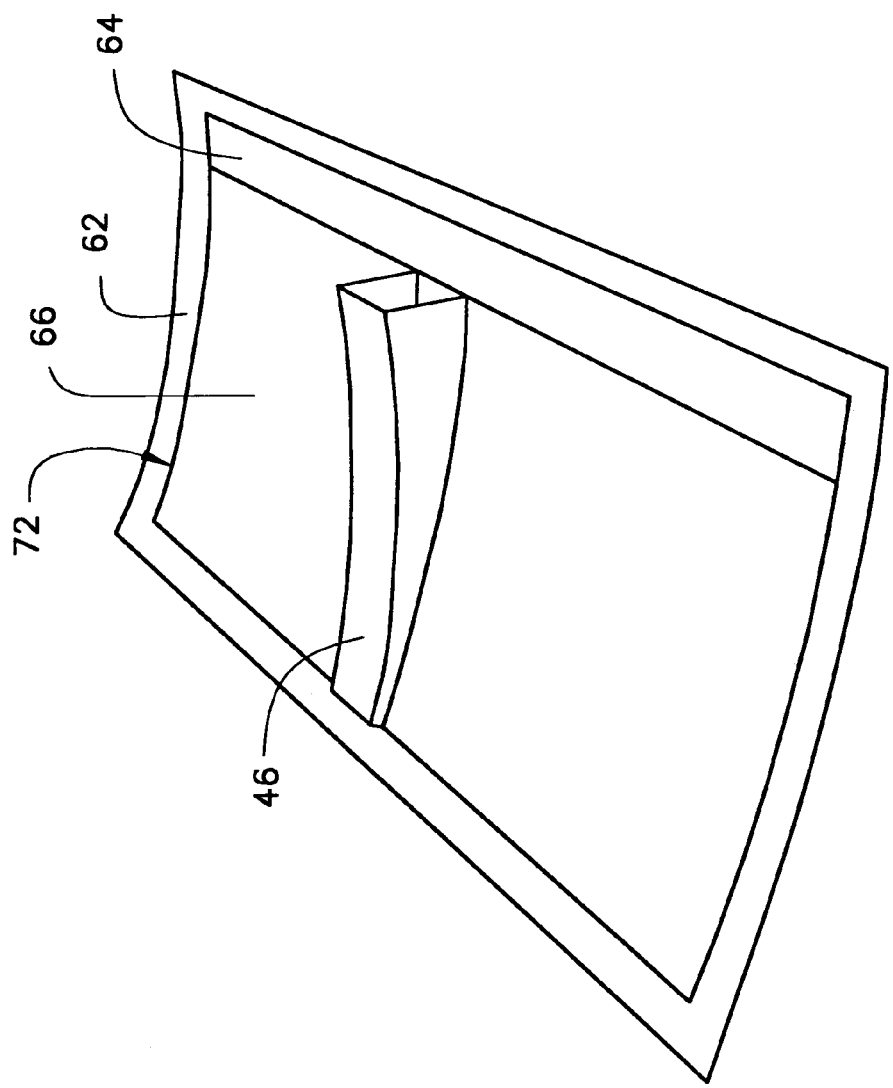
FIG. 10 is a perspective view of a another stage in the process of fabricating the article of FIG. 1, in accordance with the present invention.

The process described above for FIGS. 2-8 is now repeated for the second component 72 of the lay up assembly, illustrated in FIGS. 9 and 10. As illustrated in FIG. 9, uncured composite layer 64 is placed on COBJ 62. Lightweight hollow mandrel 46 is layed-up on the composite layer 64 by a suitable uncured tacking adhesive, as illustrated in FIG. 3. An exemplary tacking adhesive is BMS 5-154, described above. Mandrel 46 is substantially identical to mandrels 40 and 42, described above, and illustrated in FIGS. 4-5. Fillets 50, as illustrated in FIG. 3, may be placed in corners 48 of mandrel 46. As illustrated in FIG. 10, uncured composite layer 66 is then assembled on the COBJ 62 over the upper outer surface of the hollow mandrel 46 and over at least a portion of the first composite layer 64. Component 72 in FIG. 10 comprises the third uncured composite layer 64, mandrel 46, and the fourth uncured composite layer 66. The vacuum procedure described above and illustrated in FIGS. 7-8 is repeated to form the uncured composite layer 66 over the mandrel 46 and uncured composite layer 64.

Figure 11:
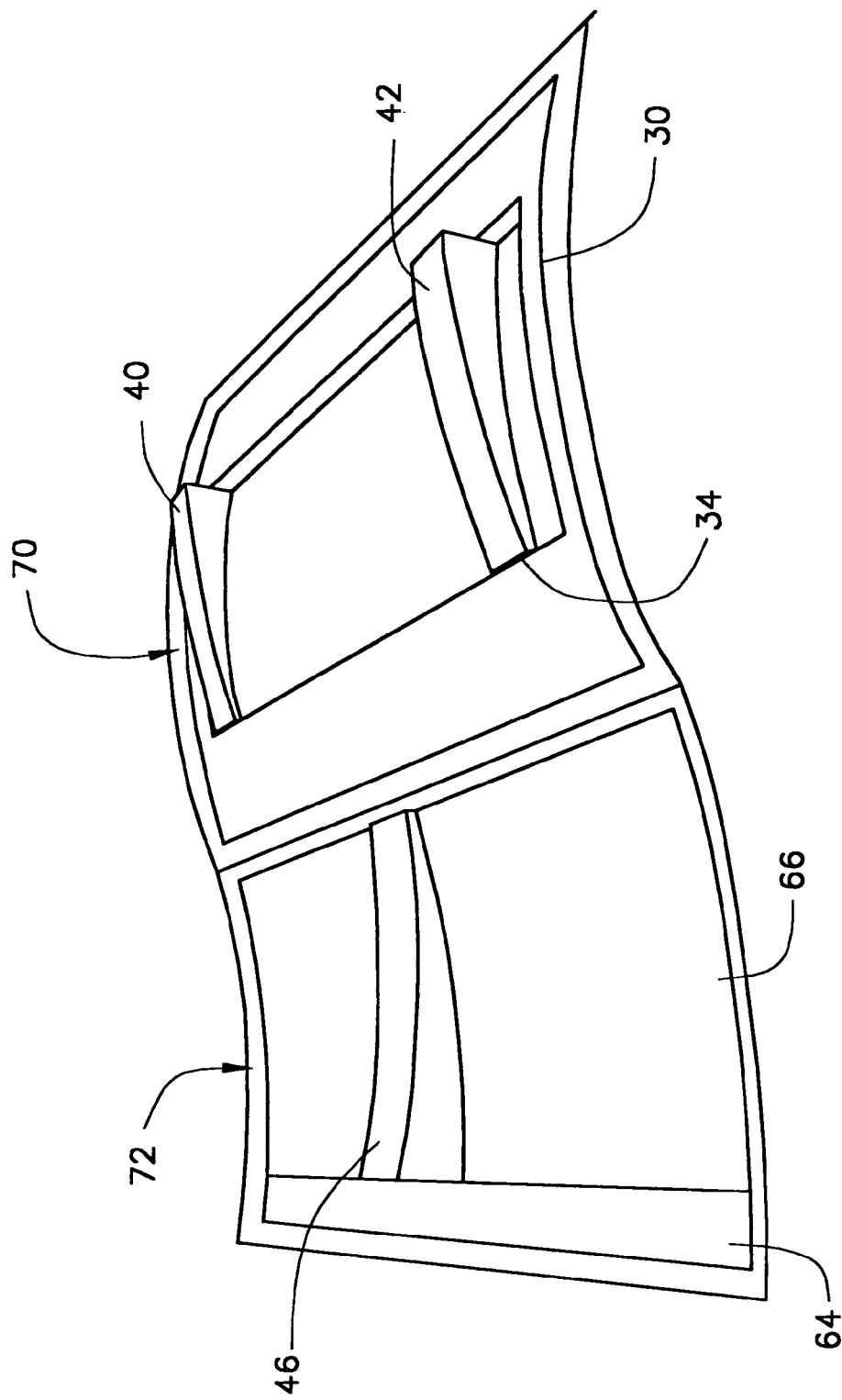
FIG. 11 is a perspective view of a further stage in the process of fabricating the article of FIG. 1, in accordance with the present invention.
Figure 12:
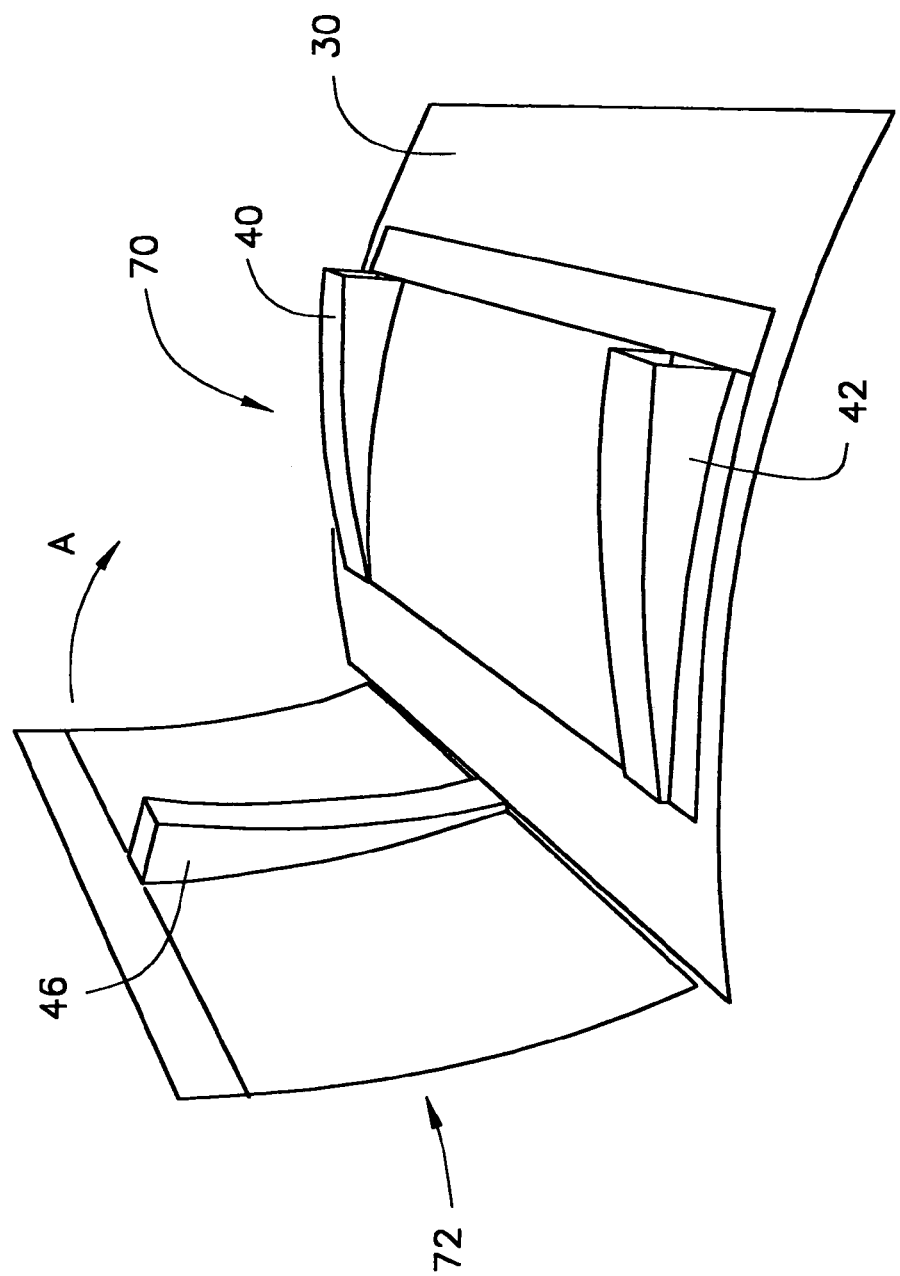
FIG. 12 is a perspective view of a still further stage in the process of fabricating the article of FIG. 1, in accordance with the present invention.
Figure 13:
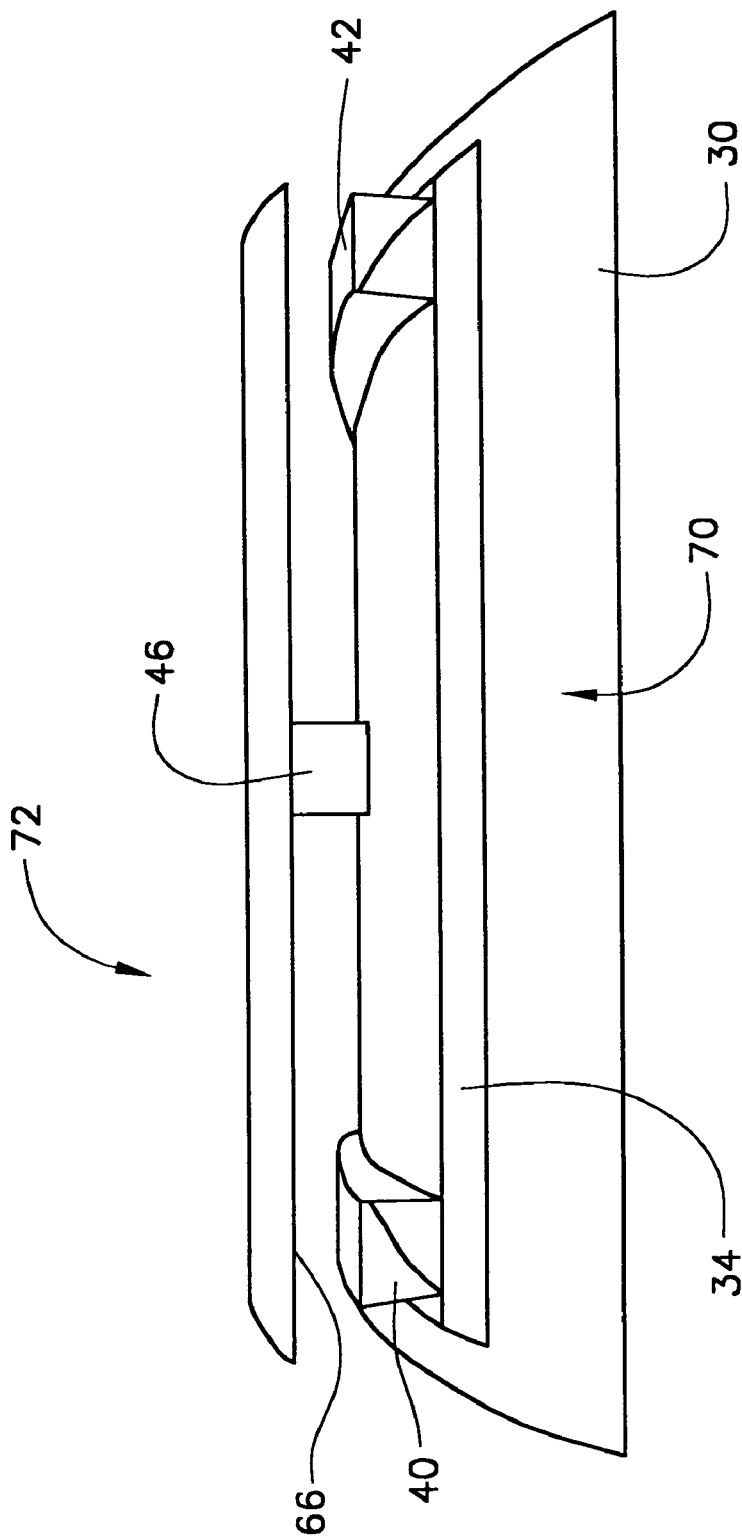
FIG. 13 is a perspective view of another stage in the process of fabricating the article of FIG. 1, in accordance with the present invention.

As illustrated in FIGS. 11, 12, and 13, the two components 70 and 72 of the lay up assembly are arranged for curing. In particular, second component 72 may be moved as indicated by arrow A (FIG. 12), and positioned such that the mandrel 46 is positioned between laterally spaced-apart mandrels 40 and 42 (FIG. 13). Moreover, second uncured composite layer 66 of component 72 is placed in engagement with second uncured composite layer 34 of component 70 as shown in FIG. 13.

Figure 14:
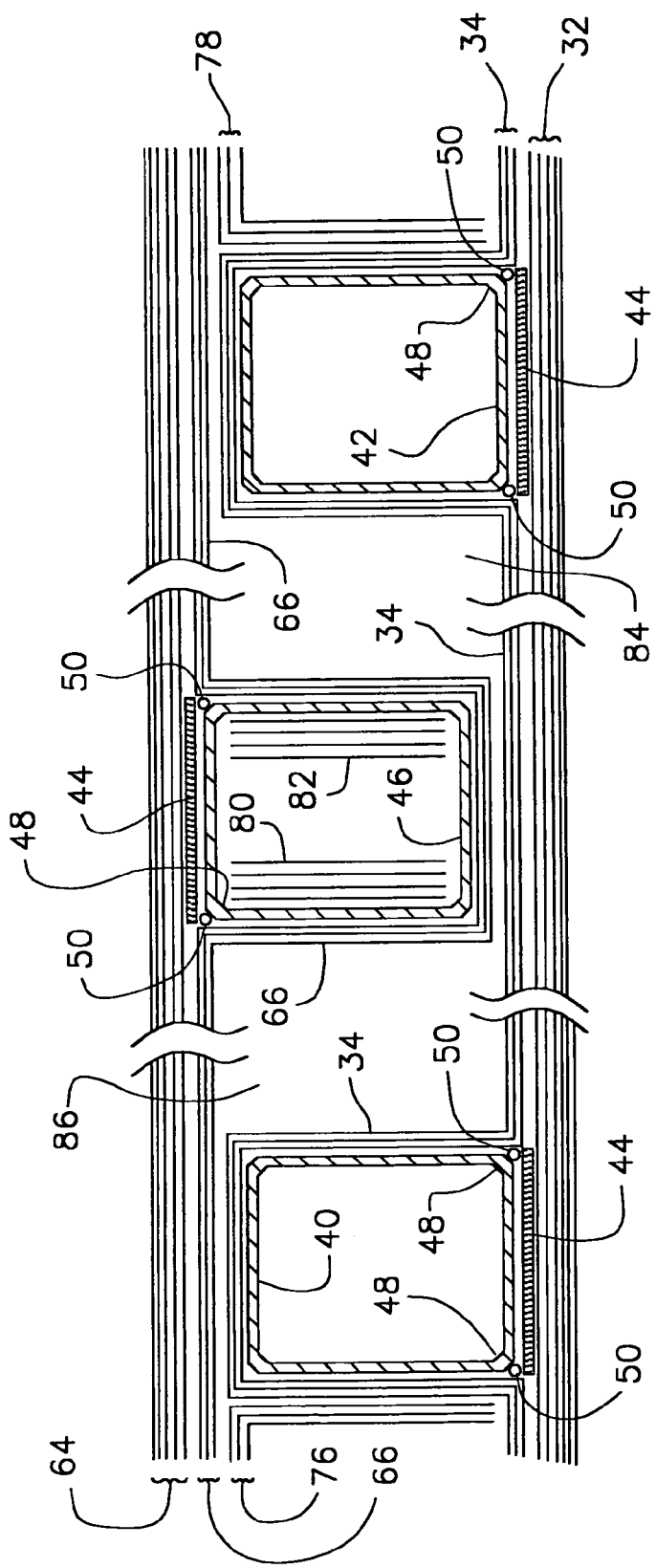
FIG. 14 is a transverse sectional view of the lay-up assembly in accordance with the present invention.

With reference to FIG. 14, uncured composite layers 76 and 78 are layed-up over the side portions of mandrels 40 and 42, which assist in joining layer 66 and 34. In the exemplary embodiment, layers 76 and 78 comprise three-plies of RMS-060 Type 2. In similar fashion, layers 80 and 82 may be added to the inside forward edge of the mandrels, and if required may wrap in a 90 degree angle to form a localized forward flange that is tied into the mandrel. These type of layers are represented by 80 and 82 may be added to any of the mandrels in order to locally increase stiffness or thickness of the forward end of the mandrel for attachment of hardware at a future assembly stage. In the exemplary embodiment, layers 80 and 82 comprise four plies of RMS 060 Type 2 fabric.

The lay up assembly, arranged as shown in FIG. 14, is vacuum bagged for autoclave cure. Vacuum tube bags, similar to vacuum tube bags 52 in FIG. 7, described above, are placed within mandrels 40, 42, and 46, and within the open spaces between the opposing skin stiffeners as depicted by 84 and 86 in FIG. 14. A non-bondable separator film is placed over the lay up and a breather fabric is placed over the non-bondable material. Finally, an outer bag is placed over the entire lay up, and is sealed to the bond tool and the individual tube bags, as previously described above. The lay up assembly arranged on the COBJ 30 is then placed in a suitable autoclave and subjected to a suitable curing cycle having an elevated temperature and elevated pressure over a desired time period to provide for curing of the layers 32, 34 and 64, 66 and the hollow mandrels 40, 42, and 46 into a unitary co-cured one piece aerostructure article. The increased pressure within the autoclave will be balanced by the pressure within the hollow mandrels 40, 42, and 46 since the expanded tube bags will conform to the interior shape of the hollow mandrels 40, 42, and 46 (as illustrated in FIGS. 7-8).

The pressure used for curing the aerostructure article 10 in the autoclave can be within a range of 65-75 psig for the curing cycle for resin-impregnated graphite or aramid fabric material. Other higher pressures could be used for the curing cycle, as may be desired for other advanced composite materials. The use of an increased pressure provides for greater quality of the article and increased physical properties. The curing process will provide for the resins of the first composite preform layers 32 and 64 and second composite preform layers 34 and 66 to penetrate the graphite fabric material of the hollow mandrels 40, 42, and 46 and the tacking adhesive flows as well to provide an integral co-cured article.

After the curing cycle has been completed in the autoclave, the COBJ 30 is removed from the autoclave and the vacuum bags are removed from the article 10 and the mandrels 40, 42, and 46. The article 10 may then be removed from the COBJ 30 and suitably trimmed for further use.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. An article of fiber-reinforced composite material formed by co-curing a lay up under a cycle of heat and pressure, wherein the lay up comprises:
   a first uncured composite layer having an upper surface and at least one uncured resin-impregnated laminate layer;
   at least one hollow mandrel comprised of a stiffened braided fabric and having an upper, a lower and side surfaces and being secured on the upper surface of the first composite layer with the lower surface thereof in engagement with the upper surface of the first composite layer; and
   a second uncured composite layer positioned over the upper and side surfaces of the hollow mandrel and at least a portion of the upper surface of the first uncured composite layer, the second uncured composite layer having at least one uncured resin-impregnated layer, wherein the hollow mandrel is retained in the co-cured article.

2. The article of claim 1, wherein the hollow mandrel of the lay up is impregnated with a resin.

3. The article of claim 1, wherein the hollow mandrel of the lay up is cured to a predetermined shape.

4. The article of claim 1, wherein at least one of the upper and lower surface of the hollow mandrel has a curved shape.

5. The article of claim 1, wherein the hollow mandrel of the lay up has a cross-sectional area that varies along a longitudinal extent thereof.

6. The article of claim 1, wherein the lay up includes at least two hollow mandrels secured to the first composite layer in a laterally spaced-apart relation, and wherein the second composite layer covers the two laterally spaced-apart hollow mandrels.

7. The article of claim 1, wherein at least one of the first and second uncured composite layer comprises a plurality of serially laid-up uncured resin impregnated layers.

8. The article of claim 1, further comprising:
   a third uncured composite layer having an upper surface and at least one uncured resin-impregnated laminate layer;
   a second hollow mandrel comprised of a stiffened braided fabric and having an upper, a lower and side surfaces and being secured on the upper surface, of the third composite layer with the lower surface thereof in engagement with the upper surface of the third uncured composite layer; and
   a fourth uncured composite layer positioned over the upper and side surfaces of the second hollow mandrel and at least a portion of the upper surface of the third uncured composite layer, the fourth uncured composite layer having at least one uncured resin-impregnated layer, wherein the second hollow mandrel is retained in the co-cured article, and
   wherein the second composite layer is in engagement with the fourth composite layer.

9. An article, comprising:
   a first composite layer formed of an uncured resin-impregnated laminate layer;
   a hollow mandrel comprised of a stiffened braided fabric and having a lower, an upper and side surfaces, the lower surfaces secured to the upper surface of the first composite layer; and
   a second composite layer formed of an uncured resin-impregnated laminate layer that is secured to at least portions of the first composite layer and to the upper and side surfaces of the hollow mandrel, the first and second composite layers being co-cured to provide an integral one piece article having reinforcing hat sections formed by the second composite layer.

10. The article of claim 9, wherein the hollow mandrel is impregnated with a resin.

11. The article of claim 9, wherein the hollow mandrel is pre-cured to a predetermined shape.

12. The article of claim 9, wherein at least one of the upper and lower surface of the hollow mandrel has a curved shape.

13. The article of claim 9, wherein the hollow mandrel has a cross-sectional area that varies along a longitudinal extent thereof.

14. The article of claim 9, wherein at least one of the first and second uncured composite layer comprises a plurality of serially laid-up uncured resin impregnated layers.

15. The article of claim 9, wherein the article includes at least two hollow mandrels secured to the first composite layer in a laterally spaced-apart relation, and wherein the second composite layer covers the two laterally spaced-apart hollow mandrels.

16. The article of claim 9, further comprising:
   a third uncured composite layer having an upper surface and at least one uncured resin-impregnated laminate layer;
   a second hollow mandrel comprised of a stiffened braided fabric and having an upper, a lower and side surfaces and being secured on the upper surface of the third composite layer with the lower surface thereof in engagement with the upper surface of the third uncured composite layer; and
   a fourth uncured composite layer over the upper and side surfaces of the second hollow mandrel and at least a portion of the upper surface of the third uncured composite layer, the fourth uncured composite layer having at least one uncured resin-impregnated layer, wherein the second hollow mandrel is retained in the co-cured article, and
   wherein the second composite layer is in engagement with the fourth composite layer, and the first, second, third and fourth composite layers being co-cured to provide an integral one piece article.

* * * * *

UNITED STATES PATENT AND TRADEMARK OFFICE
CERTIFICATE OF CORRECTION

PATENT NO. : 7,625,618 B1
APPLICATION NO. : 10/440061
DATED : December 1, 2009
INVENTOR(S) : Allen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this

Second Day of November, 2010

David J. Kappos
*Director of the United States Patent and Trademark Office*